March 19, 1963  C. E. PRATER  3,081,564
VEHICLE LAND CLEARING ATTACHMENT
Filed April 18, 1958
FIG.1
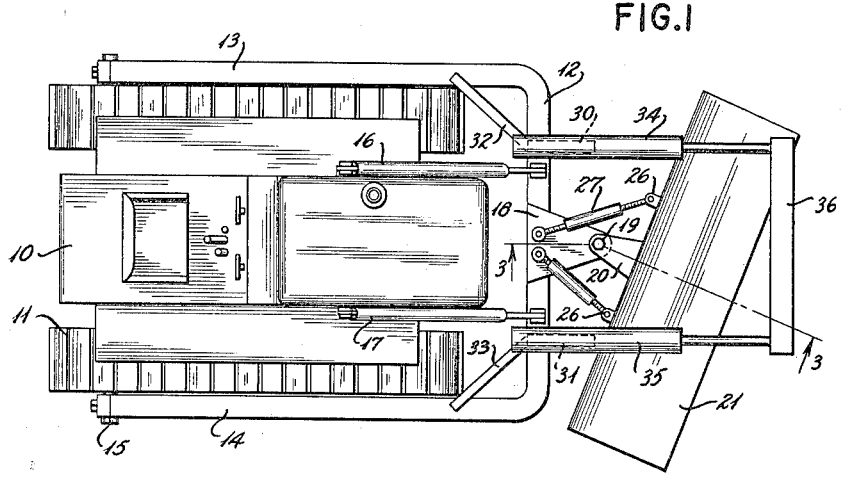
FIG.2
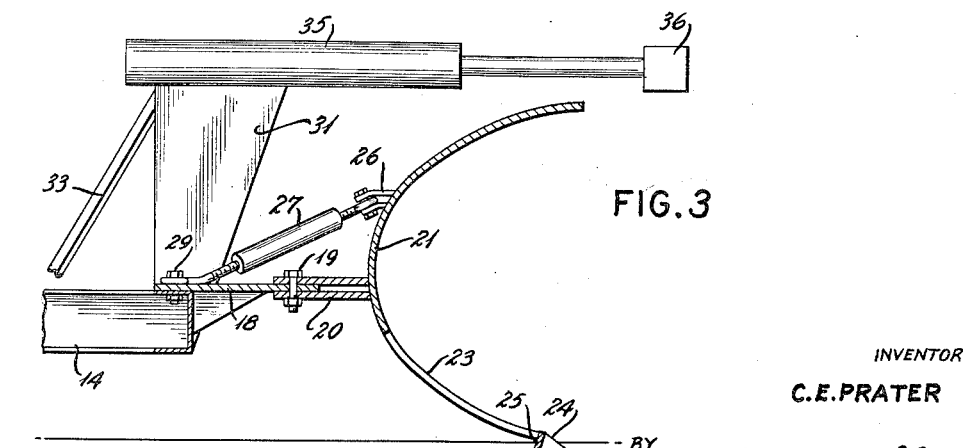
FIG.3
INVENTOR
C.E. PRATER
BY A. Yates Dowell
ATTORNEY 3,081,564
VEHICLE LAND CLEARING ATTACHMENT
Charles E. Prater, Montgomery, Ala., assignor to
P.A.B.B. Incorporated, Meridian, Miss.
Filed Apr. 18, 1958, Ser. No. 729,471
9 Claims. (Cl. 37—2)

This invention relates to land working vehicles and equipment employed in the various operations performed having to do with clearing of land and the like.

The invention relates specifically to power equipment for pushing, pulling, cutting, raking and the like and employed for the removal of trees, roots, stumps, stones, and other objects, as well as the separation of the soil from such objects and the disposition of the objects in a line or windrow beside the path of operation.

It is an object of the invention to provide power operated self-propelled land working equipment for pushing, pulling, digging, cutting, scraping, raking and piling operations above, beneath and upon the surface of the ground.

Another object of the invention is to provide land clearing equipment including an attachment for application upon a tractor or bulldozer and useable to remove trees, stumps, undergrowth, roots and other objects and obstructions as well as to remove earth or sand therefrom and which can be used to push over a tree and thereafter to project beneath the roots thereof to complete the removal of the tree and to dislodge sand clinging to its roots.

Another object of the invention is to provide a bulldozer blade which can be adjusted in height or elevated for transportation, and having in conjunction therewith and extending ahead of the same an earth-engaging member in the form of a curved blade having openings so that it provides in effect a series of massive tines, and with a ram or pusher thereabove engageable against a tree or other object and the tines subsequently extended beneath the roots for removing the tree from its moorings.

A further object of the invention is to provide the desired equipment with a minimum of modification of the vehicle and minimum supplemental equipment as well as equipment which is easy to produce, assemble, install and maintain.

Other objects and advantages of the invention will be apparent from the following description taken in conjunction with the accompanying drawing wherein FIG. 1 is a top plan view illustrating one application of the invention;

FIG. 2, a side elevation of the device of FIG. 1, ready to be used; and

FIG. 3, a section on the line 3—3 of FIG. 1.

Briefly stated, the present invention substitutes for the straight blade of a bulldozer a curved blade having its concave surface forward and with a series of parallel projections designed to extend into the earth, and parallel openings for the passage of dirt therethrough. The curved blade is pivoted centrally of the vehicle and is provided on opposite sides with adjustable turn buckle braces for varying the angular position of the blade. Mounted above the blade is a ram or pusher supported at each end by a hydraulic piston and cylinder. Consequently the curved blade may be raised and lowered in the usual manner, the ram or pusher being disposed at a slightly higher elevation over and projectable outwardly ahead of the blade and controlled by the operator of the vehicle so that the blade and ram or pusher may be used for the performance of various tasks.

With continued reference to the drawing, a tractor 10 having endless treads 11 is transformed into a bulldozer by the application of a substantially U-shaped mounting frame having a forwardly disposed connecting portion or cross member 12 and rearwardly extending arms 13 and 14, the free ends of which are pivoted on the rear axle 15 of the tractor.

The forwardly disposed connecting portion 12 of the U-shaped frame is supported by spaced parallel hydraulic pistons and cylinders 16 and 17 attached to the tractor and subject to the control of the operator. By the operation of the hydraulic pistons and cylinders 16 and 17 the front cross member 12 of the mounting frame may be raised or lowered.

Attached centrally to the front cross member 12 is a generally triangular pivot plate 18 to which is connected, by means of a pivot pin 19, a pair of pivot plates 20 disposed one above the other attached to a curved blade 21 having cut-out portions 22 providing spaced prongs or tines 23 with teeth-forming tips 24 mounted on a separate plate 25 fastened across the free ends of the prongs or tines 23. The concave portion of the blade is disposed forwardly and the prongs 23 thereof permit the passage therethrough of small particles of soil when the blade is forced into the earth. Thus the blade may be used for subsurface grubbing and also may be used as a scoop its curved surface causing the trembling and shaking of roots, stones and other objects taken from the ground by the teeth to loosen and separate the dirt from the roots.

The curved blade is provided with supporting braces providing a three-point suspension, the blade having pairs of spaced ears 26 located at a higher elevation than and on opposite side of the pivot plates 20 to which are connected turn buckles 27. The opposite ends of the turn buckles 27 are connected through the pivot plate 18 to the forward portion 12 of the mounting frame by means of fasteners 29. By this construction the blade 21 may be set at the desired angle and may be raised and lowered with the raising and lowering of the forward transverse portion 12 of the mounting frame.

The structure described constitutes in effect a bulldozer and in order to increase the operative capacity of the structure in addition to the bulldozer blade a hydraulic ram or pusher is provided which can be operated when the vehicle is at rest. This is accomplished by the provision of a pair of spaced brackets 30 and 31 having their lower ends welded or otherwise fixed to the forward member 12 of the mounting frame, the upper portions of which are reinforced by braces 32 and 33 and with their lower ends welded to the arms of the mounting frame.

On the upper portion of the support 31 are mounted pistons and cylinders 34 and 35 connected to a ram or pusher bar 36. The hydraulic pistons and cylinders 35 and the ram 36 are located slightly above the upper portion of the blade 21 and the blade and the arm may be used cooperatively to achieve the desired result.

It will be apparent from the foregoing that a concave bulldozer blade is provided having circular elongated openings in its lower portion through which soil and small objects may pass while larger objects will be engaged by the blade. The blade may be disposed in a manner to cause discharge therefrom at either side of the vehicle. Above the blade is a ram or pusher which can be used to push over a tree or apply force to other objects and thereafter the blade caused to engage the lower portion of such object or the earth at lower level than the ram or pusher. The blade and ram or pusher are easy to install, use and maintain and are effective in use.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. An attachment for a vehicle for cutting away underbrush above the surface of the earth comprising an elongated cutter having means by which it may be centrally and pivotally mounted and having elongated side by side openings through which small particles can pass, an adjustable brace attached to said cutter at each side of said pivotal mounting and at a different elevation therefrom and providing with said pivotal mounting a three-point suspension for said cutter, and a hydraulically operated ram having means by which it may be mounted above said cutter and movable forwardly of said cutter in a manner to engage an obstruction ahead of said cutter.

2. The structure of claim 1 having means by which said ram may be projected and retracted.

3. An elongated cutter mounted for cutting growth above the ground, said cutter having means by which it may be centrally pivoted, braces attached to said cutter at a different elevation from the means by which the cutter may be pivoted providing in effect a three-point suspension for said cutter whereby said cutter may be disposed angularly with regard to its line of travel, a ram mounted above said cutter and projectable forwardly of said cutter in a manner to engage obstructions ahead of said cutter, said cutter and said ram being carried by a common supporting member that may be independently and cooperatively used.

4. For use on a self-propelled vehicle an attachment comprising an elongated concave cutter blade having means for pivoting the same centrally across the front of the vehicle in a manner to cut in spaced relation above the surface of the earth and adjustable in height, said blade having elongated side by side openings through which soil or small particles can pass, braces for supporting said blade, one at each side of said means for pivoting said blade and at a higher elevation and providing in effect a three-point suspension for said blade, and a hydraulically operated ram having means by which it may be mounted above for cooperative use with said blade, said ram being projectable forwardly of said blade in a manner to engage obstructions ahead of said blade.

5. In combination a vehicle including a substantially U-shaped mounting frame having the free ends of the arms of the U-shaped member pivotally supported on the rear axle of the bulldozer and with the connecting portion of the U-shaped mounting member disposed across the front of the bulldozer, hydraulic means for raising and lowering said connecting portion of the U-shaped member, an elongated concave blade pivoted centrally across the front of said bulldozer and having elongated side by side openings through which soil or small particles can pass, braces adjustably supporting said blade from said mounting frame, one at each side of said pivot and at a higher elevation and providing in effect a three-point suspension for said blade, and a hydraulically operated ram mounted above said blade and projectable forwardly of said blade in a manner to engage obstructions ahead of said blade.

6. Land clearing mechanism for attachment to the leading end of the pivoted U-shaped mounting frame of a bulldozer comprising a curved blade having a plurality of open slots at the bottom leading edge thereof defining spaced teeth, means to mount said curved blade for angular disposition of the blade relative to the movement of the bulldozer, a pair of hydraulic cylinders mounted in fixed position on said U-shaped mounting frame and extending forwardly of and terminating adjacent the top edge of the curved blade, a pusher bar extending between said cylinders and fixed to the piston rods of said cylinders whereby said pusher bar can be pushed forwardly beyond the curved blade in a direction substantially in line with movement of the bulldozer, and means to project said pusher bar into engagement with a tree whereby a bulldozer may force the tree to fall in a forward direction and further movement of the tree can be obtained by the operation of the hydraulic cylinders to obtain an additional lifting action on the tree while the bulldozer is moving or while the bulldozer is stationary.

7. Land clearing mechanism for attachment to the mounting frame of a bulldozer, said mechanism comprising a curved blade having spaced depending teeth means mounting said blade for angular adjustment relative to the line of movement of said bulldozer, a pusher bar mounted for movement above and forwardly of said blade, and hydraulic means for advancing and retracting said pusher bar whereby said mechanism can be operated to push over a tree and said teeth caused to move under and raise the roots of the tree.

8. Land clearing equipment comprising a tractor having pusher arms pivoted thereon and a cross bar connecting said pusher arms, a blade including a plurality of prongs arranged in echelon arrangement and extending diagonally of said pusher arms for engaging earth and moving the earth and shrubs laterally, a bar connecting the leading ends of the prongs and providing relative support between such prongs, a pair of hydraulic cylinders mounted on the forward end of said pusher arms, a cross bar extending between the piston rods of the hydraulic cylinders and normally extending forwardly of the foremost portion of the teeth whereby said teeth may engage and loosen low vegetation while the cross bar between the piston rods may engage trees at a substantial height to simultaneously clear the low vegetation and remove trees in a single pass of the tractor.

9. Land clearing equipment comprising a tractor having pusher arms pivoted thereon and a cross bar connecting said pusher arms, a blade including a plurality of prongs arranged in echelon arrangement and extending diagonally of said pusher arms for engaging earth and moving the earth and shrubs laterally, a bar connecting the leading ends of the prongs and providing relative support between such prongs, a pair of auxiliary pusher arms projecting from said first pusher arms forwardly of said blade, a tree engaging cross bar mounted on said pair of auxiliary pusher arms and normally extending forwardly of the foremost portion of the teeth whereby said teeth may engage and loosen low vegetation while the cross bar between the auxiliary pusher arms may engage trees at a substantial height to simultaneously clear the low vegetation and remove trees in a single pass of the tractor.

References Cited in the file of this patent

UNITED STATES PATENTS

| 1,319,058 | Fitzpatrick | Oct. 21, 1919 |
| 2,081,192 | Allin et al. | May 25, 1937 |
| 2,160,595 | Le Bleu | May 30, 1939 |
| 2,173,406 | Wilkinson | Sept. 19, 1939 |
| 2,295,458 | Edwards | Sept. 8, 1942 |
| 2,309,223 | Staring | Jan. 26, 1943 |
| 2,491,208 | Price et al. | Dec. 13, 1949 |
| 2,625,870 | Peacock et al. | Jan. 20, 1953 |
| 2,633,164 | Kissner et al. | Mar. 31, 1953 |
| 2,663,952 | Winget | Dec. 29, 1953 |
| 2,722,758 | Loftin et al. | Nov. 8, 1955 |
| 2,735,197 | Struemph | Feb. 21, 1956 |
| 2,845,725 | Robishaw | Aug. 5, 1958 |
| 2,883,775 | De Hardit | Apr. 28, 1959 |

FOREIGN PATENTS

| 477,544 | Canada | Oct. 9, 1951 |
| 144,135 | Australia | Nov. 7, 1951 |
| 159,719 | Australia | Nov. 10, 1954 |